US007583818B2

(12) United States Patent
Hegedus et al.

(10) Patent No.: US 7,583,818 B2
(45) **Date of Patent: *Sep. 1, 2009**

(54) METHOD AND SYSTEM FOR COLLECTING TRAFFIC INFORMATION USING THERMAL SENSING

(75) Inventors: Ildiko Hegedus, Glencoe, IL (US); George Lasser, Inverness, IL (US); Miklos Robert Hegedus, Glencoe, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/901,944

(22) Filed: Sep. 19, 2007

(65) Prior Publication Data

US 2008/0010003 A1 Jan. 10, 2008

Related U.S. Application Data

(63) Continuation of application No. 10/441,516, filed on May 20, 2003, now abandoned.

(51) Int. Cl.
*G06K 9/00* (2006.01)

(52) U.S. Cl. ...................................................... 382/104

(58) Field of Classification Search ................. 382/104; 701/117, 118, 119
See application file for complete search history.

(56) References Cited

U.S. PATENT DOCUMENTS

| | | | | |
|---|---|---|---|---|
| 5,774,070 | A | 6/1998 | Rendon | 340/905 |
| 5,862,244 | A * | 1/1999 | Kleiner et al. | 382/104 |
| 6,154,699 | A | 11/2000 | Williams | 701/50 |
| 6,173,231 | B1 * | 1/2001 | Chojnacki | 701/208 |
| 6,285,949 | B1 * | 9/2001 | Roediger | 701/117 |
| 6,489,920 | B1 | 12/2002 | Anders et al. | 342/179 |
| 6,556,905 | B1 * | 4/2003 | Mittelsteadt et al. | 701/35 |
| 6,608,559 | B1 | 8/2003 | Lemelson et al. | 340/539.13 |
| 6,798,357 | B1 * | 9/2004 | Khan | 340/989 |
| 2003/0222820 | A1 | 12/2003 | Karr et al. | 342/457 |
| 2005/0033505 | A1 * | 2/2005 | Zatz | 701/117 |

OTHER PUBLICATIONS

Weiser, Carl, The Cincinnati Enquirer, Drone Research Looks at Traffic Applications (Dated: May 29, 2003), 6 pages, web address: http://www.enquirer.com/editions/2003/05/26/loc_roaddrones26.html.

* cited by examiner

*Primary Examiner*—Brian P Werner
*Assistant Examiner*—Claire Wang
(74) *Attorney, Agent, or Firm*—Adil M. Mosabji; Frank J. Kozak; Jon D. Shutter

(57) ABSTRACT

A method and system for collecting traffic data are disclosed. From a satellite or aircraft located at an altitude above a geographic area, a thermal image of the geographic area is obtained. Using a geographic database, the thermal image is matched to the positions of roads in the geographic area. The thermal image is used to determine traffic parameters, such as densities and speed, at specific locations along the roads.

20 Claims, 3 Drawing Sheets

METHOD AND SYSTEM FOR COLLECTING TRAFFIC INFORMATION USING THERMAL SENSING

REFERENCE TO RELATED APPLICATION

The present application is a continuation of Ser. No. 10/441,516, filed May 20, 2003, now abandoned the entire disclosure of which is incorporated by reference herein.

BACKGROUND OF THE INVENTION

The present invention relates to collecting information about traffic along roads in a geographic area, and in particular, the present invention relates to an efficient way for collecting real-time traffic information.

Traffic information is used for various purposes. Commuters use traffic information to plan their commutes to work. Trucking companies use traffic information to plan routes that minimize delays. Delivery companies use traffic information to determine routes that are most efficient. Government agencies use traffic information for emergency response purposes, as well as to plan new highways and make other improvements.

There are different kinds of traffic information. Real-time traffic information indicates the actual conditions that exist on roadways at the present time. Historical traffic information indicates the long-term average traffic conditions that have existed on roadways over a period of time. There are also different types of traffic information that are collected. For example, one important type of traffic information relates to traffic incidents (e.g., accidents) that have relatively short-term, but significant effects. Other important types of traffic information include traffic flow, traffic volume, transit times, throughput and average speed.

There are various ways to collect traffic information. One way to collect traffic information is to place sensors along roadways. Another way to collect traffic information is to observe traffic conditions from a tall building or aircraft (e.g., a traffic helicopter). Still another way to obtain traffic information is to have a number of vehicles travel along roads and report traffic information back to a traffic information center.

Although these existing ways to collect traffic information are satisfactory, there still exists room for improvements. Infrastructure-based methods are associated with relatively high deployment costs thereby limiting them to major roads. Vehicle-based methods are associated with communications and processing costs that have limited deployment of these methods as well. Accordingly, it would be beneficial to have a method that collects traffic information for a large number of roads efficiently and reliably.

SUMMARY OF THE INVENTION

To address these and other objectives, the present invention includes a system and method for collecting traffic data. From a satellite or aircraft located at an altitude above a geographic area, a thermal image of the geographic area is obtained. Using a geographic database that includes data about roads in the geographic area, including such information as the names, positions, and speed limits along roads, the thermal image is matched to the positions of roads in the geographic area. Using heat as an indicator of traffic, the thermal image is used to determine the traffic conditions at specific locations along the roads.

DETAILED DESCRIPTION OF THE PRESENTLY PREFERRED EMBODIMENTS

Figure 1:
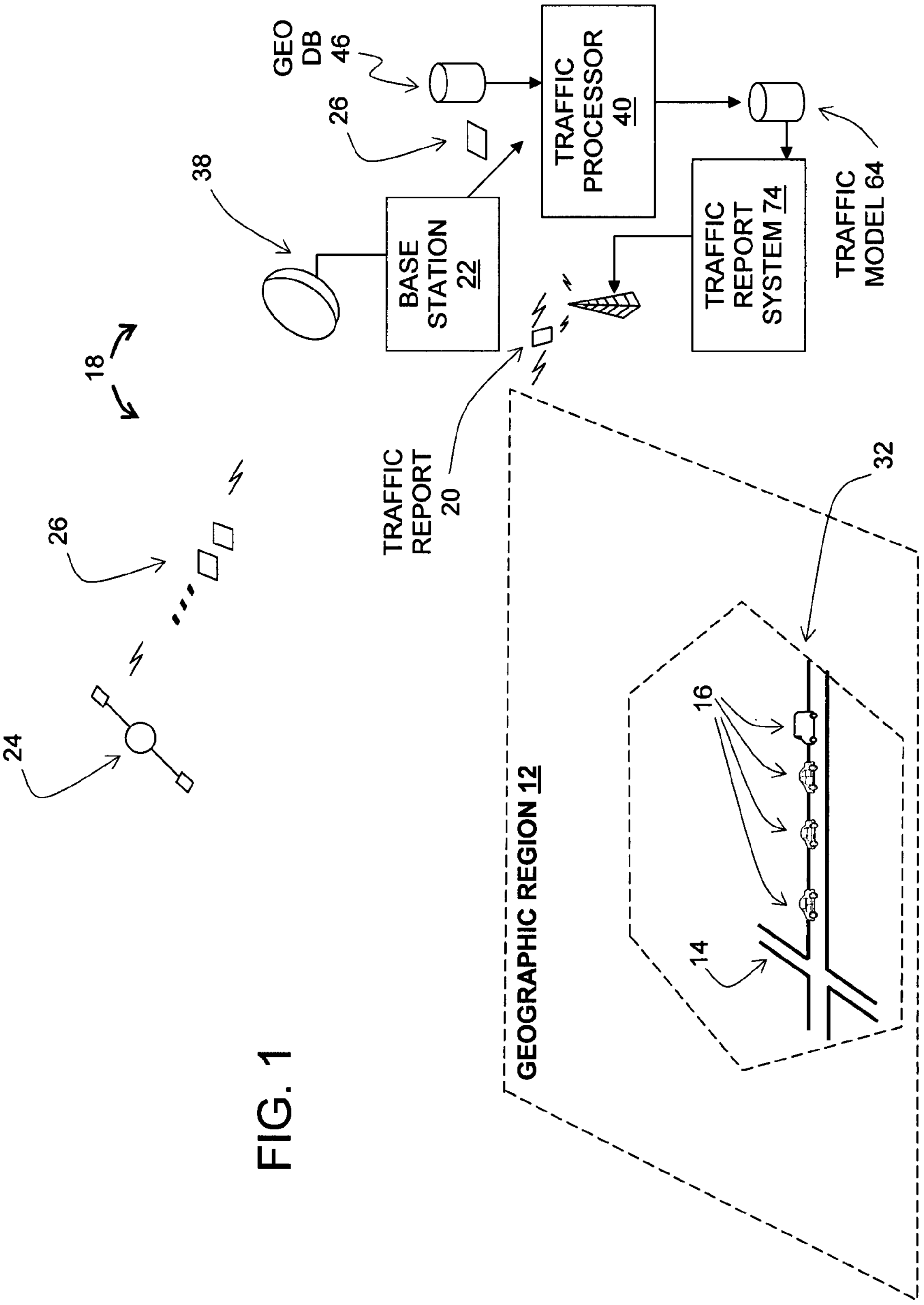
FIG. 1 is an illustration of a geographic region and an embodiment of the present system used to collect traffic information.

FIG. 1 shows a geographic region 12. The geographic region 12 may correspond to a metropolitan region or alternatively, the geographic region may correspond to a region of a different size.

Located in the geographic region is a road network 14. The road network 14 may include freeways, major highways, major business roads, minor business roads, residential streets, alleys, and rural roads. Vehicles 16 travel on the road network 14.

A traffic information system 18 collects information about traffic conditions on the road network 14. The traffic information system 18 also broadcasts reports 20 about traffic conditions to the vehicles 16, as well as to other end users. The traffic information system 18 includes several components. According to one embodiment, the traffic information system 18 includes a base station 22 and one or more satellites 24. In one embodiment, the one or more satellites 24 may be owned and operated by a private or commercial entity. Alternatively, the one or more satellites 24 may be owned and operated by a government agency, such as NASA or USGS, that uses advanced remote sensing technologies, e.g., LANDSAT.

Each satellite 24 functions as a platform to capture thermal video images of geographic areas and transmit the images back to Earth. Each satellite 24 includes thermal imaging equipment. The thermal imaging equipment in each satellite 24 is a combination of hardware and software. The thermal imaging equipment in the satellite 24 includes a suitable camera, lens, aiming and focusing equipment, and so on. All these components are known to those of skill in the art.

Figure 2:
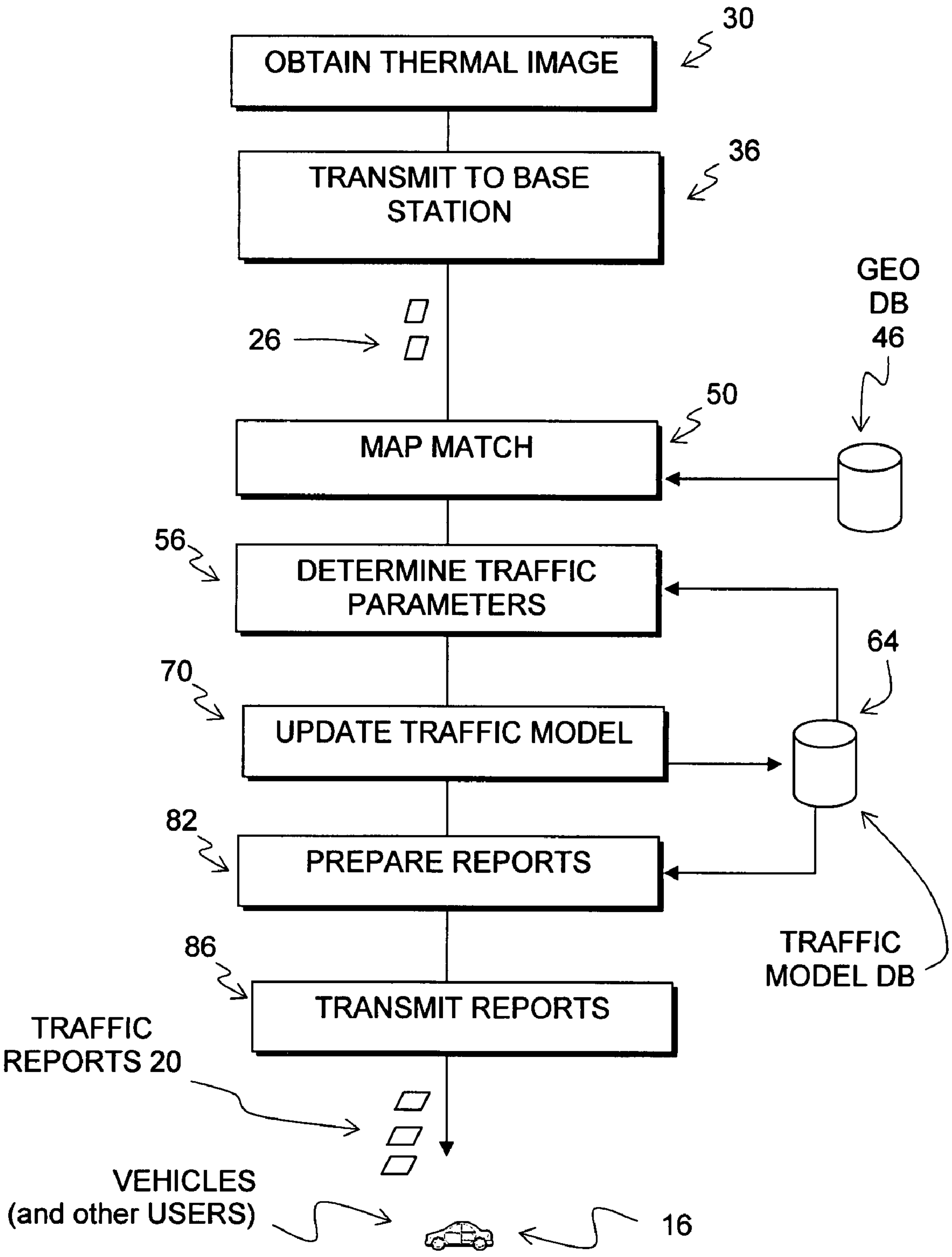
FIG. 2 is a flowchart showing steps in a process for collecting traffic information using the system of FIG. 1.
Figure 3:
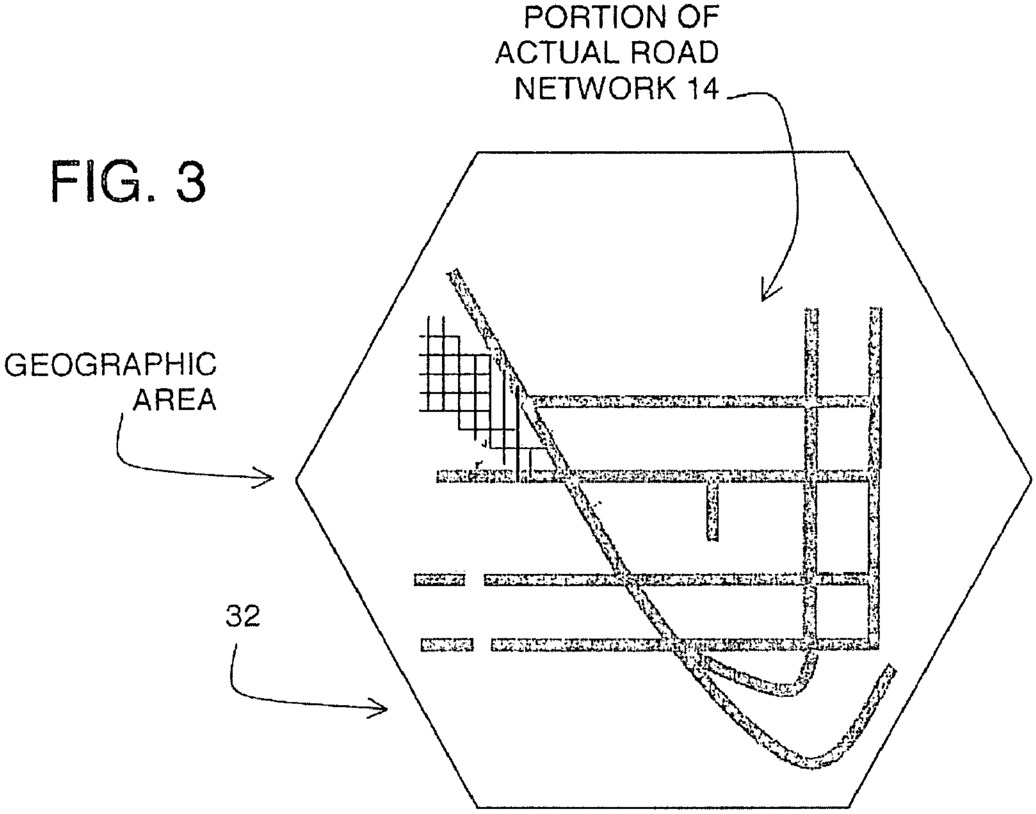
FIG. 3 shows a map of a portion of the geographic region in FIG. 1, including a portion of a road network.
Figure 4:
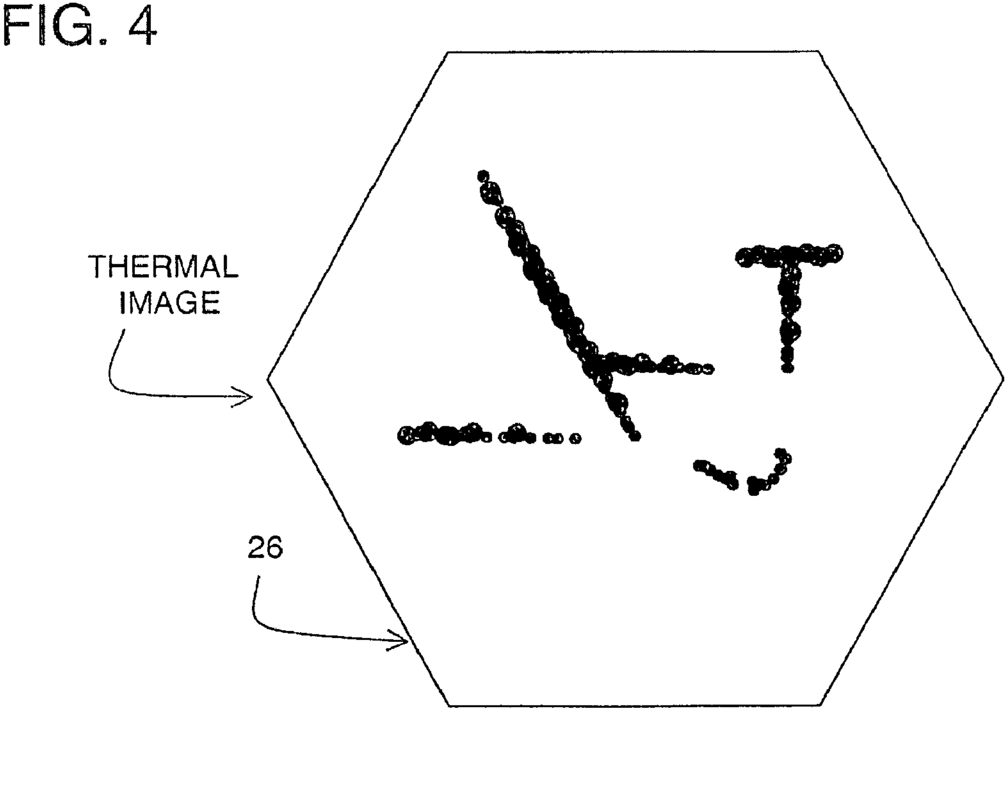
FIG. 4 is an illustration of a thermal image of the geographic area shown in FIG. 3.

The thermal imaging equipment takes thermal images 26 of specific geographic areas on the Earth (Step 30 in FIG. 2). The geographic areas are portions of the geographic region 12. FIGS. 1 and 3 show a geographic area 32 included in the geographic region 12. FIG. 4 is an illustration of a thermal image 26 of the geographic area shown in FIG. 3. In FIG. 4, dark areas correspond to areas of higher temperature. As shown in FIG. 4, the thermal image 26 is a real-time created value-added data layer of the geographic area that matches the existing digital map database image shown in FIG. 3.

The thermal images 26 taken by the satellite 24 are sufficiently detailed to determine temperatures and/or temperature differentials on the surface of the Earth. In one embodiment, the thermal images have a resolution of one or more (e.g., 4) pixels per square meter. Each pixel picks up a range of frequencies, i.e., temperatures. Other resolutions, including higher and lower resolutions, may be suitable.

Various kinds of filters, color enhancements, etc., may be used to identify specific temperatures or temperature ranges to enhance contrast.

In one embodiment, a thermal frequency interval for the thermal images is selected that takes into account various factors. According to Wien's law, the frequency having the greatest radiation power density is directly proportionate to the Kelvin temperature of any object.

$$\text{Wavelength of Maximum Intensity (cm)} = \frac{.29}{T(°\text{K})}$$

Substituting room temperature for maximum frequency, a value of approximately $3\times10^{13}$ Hertz is obtained. The infrared thermal band is chosen because objects at normal temperatures emit the maximum intensity of electromagnetic radiation in this band (in the interval of $10^{10}$ to $10^{14}$ Hertz frequency).

The size of the geographic area in a thermal image is selected to take into account various factors. Some of these factors may include the altitude of the satellite, the type of camera, the type of geographic area (e.g., rural, urban, suburban), the communications system resources between the satellite and the ground station (e.g., bandwidth), the relative surface speed of the satellite, the availability of other satellites, and various other factors. In one embodiment, the geographic area is approximately 10 km by 10 km, although smaller and larger sizes may be used.

In one embodiment, the geographic area contained in each thermal image is hexagonal in shape. A hexagonal shape efficiently utilizes the optical capabilities and viewpoint of a satellite-based camera. Hexagonal images are optimally tessellated, thus condensing the conical view with minimal overlap.

Referring again to FIG. 1, the thermal images 26 taken by the satellite 24 are transmitted from the satellite 24 to the base station 22 (Step 36 in FIG. 2). The satellite 24 and base station 22 use a communications system 38 for this purpose. Suitable communications systems are known to those of skill in the art. In one embodiment, a low frequency radio wave is used.

The base station 22 is a collection of hardware and software components that receive the thermal images 26 from the one or more satellites 24. After the thermal images 26 are received in the base station 22, the thermal images 26 are processed.

In one embodiment, each thermal image represents only a portion of the entire region for which traffic information is being collected. Accordingly, one step in the process includes assembling multiple images of relatively small areas into an image of a relatively larger area.

Once the smaller thermal images are assembled into a single, larger image, the larger image is input to a traffic data processor 40. The traffic data processor 40 may be located at the base station 22 or may be located elsewhere. The traffic data processor 40 is a combination of a hardware and software components, including one or more computing platforms.

The traffic data processor 40 has access to a geographic (or map) database 46. The geographic database 46 includes data about the geographic features located in the region 12. The geographic database 46 includes information that identifies the positions of each of the roads represented therein. For example, in one embodiment, the geographic database 46 includes data that identify points (e.g., latitude, longitude, and altitude) along each of the represented roads. The geographic database 46 also includes data that identify the name and/or highway designation of each of the represented roads. The geographic database 46 may include data that indicate the number of lanes along each road, the widths of each road, the locations and widths of lane dividers and medians, the locations of ramps, intersections, bridges, tunnels, overpasses, etc. The geographic database 46 also includes information about the legal posted speed limit (or speed range category) at each point (or selected points) along the represented roads. The geographic database 46 may include other kinds of information.

The traffic data processor 40 includes software programming that uses the thermal images 26 and data from the geographic database 46 to perform various functions. One of the functions performed by the traffic data processor 40 includes matching the thermal images 26 to the locations of the roads in the geographic region using data from the geographic database 46 (Step 50 in FIG. 2). As part of the map matching, a registering process is performed. The registering process aligns locations in the thermal image with locations of roads represented in the geographic database 46. The map matching process may be configured to match data for only certain roads in the geographic region or for only certain categories of roads. Alternatively, the map matching process may be configured to match data for all the roads in the geographic region.

The matching of the thermal image to the data in the geographic database may require magnification, orientation and the translation of the thermal image. The matching process may also account for any distortion. For example, the matching process may account for the conical distortion in the thermal image resulting from the fact that the objects in the perimeter of the view field may be out of focus relative to the objects in the center.

Another function performed by the traffic data processor 40 is the calculation of traffic parameters, such as densities and speed (Step 56 in FIG. 2). When calculating traffic densities, a temperature differential is determined between a location along a road segment and a nearby location off the road segment. This temperature differential is related to the traffic congestion on the road segment. A larger temperature differential indicates relatively greater traffic congestion than a smaller temperature differential. The temperature differential arises, in part, from vehicle-related sources, such as vehicle engines, exhaust emissions, and other sources. A large temperature differential arises from a large number of vehicles moving relatively slowly and closely spaced together. A relatively smaller temperature differential occurs when vehicles are moving faster and are relatively further apart.

When using thermal images to determine traffic conditions along roadways, the traffic data processor 40 may take into account various factors. For example, metrological conditions, such as ambient temperature, wind speed and direction, humidity, sunlight, cloud cover, rain, snow, etc., may affect the relationship between the temperature differential and traffic congestion. In addition, the relationship between the temperature differential and traffic congestion may be affected by geographical conditions, such as altitude, slope, nearby bodies of water, and so on. The relationship between the temperature differential and traffic congestion may also be affected by man-made conditions, such as bridges, tunnels, shadows from nearby buildings, road surfaces, etc. Other conditions may also affect the relationship between the temperature differential and traffic conditions. In a preferred embodiment, any condition that affects the relationship between the temperature differential and traffic conditions is taken into account, to the extent possible.

In addition, the traffic data processor 40 may perform a filtering process. The filtering process filters out thermal image data from areas away from the road network.

In one embodiment, when determining traffic conditions, the traffic data processor 40 also takes into account how the temperature differentials at various locations along the road network change over time. For example, a temperature differential at a location that increases by 10° C. over a 10 minute period may indicate a rapidly developing traffic problem. To perform this process, the traffic data processor 40 uses data from a traffic data model 64. The traffic data model 64 is a database that contains the traffic information that had been previously calculated by the traffic data processor 40. The data in the traffic data model 64 is dynamic (i.e., changes relatively quickly). The information in the traffic data model 64 includes recently calculated temperature differentials, ambient temperatures, calculated traffic densities and speeds, and so on, for various locations along the road network.

After the traffic conditions at specific road locations are determined, the traffic data model 64 is updated (Step 70 in FIG. 2). When updating the traffic data model, traffic conditions, e.g., densities and speeds, for various locations on the road network are stored in the data model 64. Other parameters may be calculated and stored in data model 64. For example, transit times can be calculated. The transit time indicates the amount of time it takes a vehicle to transit a particular portion of a road. In addition, other traffic parameters may be calculated and stored, such as the average speed, speed variance, flow variance, traffic flow, etc. The traffic data model may also store data about the sensed conditions, including the temperature differentials.

Referring to FIG. 1, after the various traffic parameters are calculated, a traffic report system 74 uses the data in the traffic model 64 to prepare traffic reports 20 (Step 82 in FIG. 2). The traffic reporting system 74 may be operated by the same entity that operates the traffic processor 40 or alternatively, the traffic reporting system 74 may be operated by another entity. These traffic reports 20 can be organized into various different formats. The traffic reports can be sent directly to end users, e.g., vehicle drivers (Step 86 in FIG. 2). Alternatively, the traffic reports can be sent to other entities that use or combine the data in various ways. Some of these entities may redistribute the traffic data directly or indirectly to end users, including stationary receivers and mobile users (e.g., in vehicles 16).

The steps shown in FIG. 2 are performed on a continuous or relatively continuous basis. For example, new thermal images may be taken every several seconds or every several minutes. The updating of the traffic model and generation of traffic reports may be performed synchronously with the acquisition of thermal images or asynchronously. For example, while images may be obtained every second, the traffic model may be updated every 10 seconds and new traffic reports generated every minute. Various other time periods may be used.

Further Considerations

The present embodiment takes into account the relationships among the following variables:

Observation altitude

Viewing cone angle

Frequency interval

Resolution

Contrast

Image frame rate

The area covered by one camera is limited by the distinguishability of roads and the resolution of the camera. Generally, it is preferable to use a camera with as high resolution as possible. The cost effectiveness is related to the area/camera. A formula can be used to calculate the optimum:

$$A=\pi(H^{*}\tan\alpha)^2$$

where

H=Height (altitude)

α=Viewing angle (half cone angle)

A=Area that could be imaged

The above formula assumes that the shape of the viewing area is a circle, which is optimal for hexagonal map area tessellation. Rectangular parcelization is also a viable option.

In one embodiment, a camera that would record quality thermal images of an area as large as an entire metropolitan area (e.g., Chicago including suburbs) would be used.

Alternatives

Other systems and methods for collecting and reporting traffic information are disclosed in U.S. patent application Ser. No. 10/247,399 filed Sep. 19, 2002, entitled "METHOD AND SYSTEM FOR COLLECTING TRAFFIC INFORMATION," the entire disclosure of which is incorporated by reference herein. Embodiments of the methods and systems disclosed in Ser. No. 10/247,399 may be used or incorporated with the method and system disclosed in the present specification, and vice versa.

In an alternative embodiment, the step of map matching or the step of determining traffic densities may be performed on the satellite with suitable equipment.

In some cases, it may be necessary to augment or modify the data in the geographic database that represents the road network. For example, if the data that represent roads do not have sufficient data points along some road segments to match the data contained in the thermal images, it may be necessary to add data points (e.g., shape points) to represent locations along these road segments. Relatively densely spaced data points along road segments provide frequent thermal data sampling and may provide more accurate traffic density calculation.

As mentioned above, in one embodiment, the traffic data processor filters outs thermal image data for areas away from roads. In this embodiment, the traffic data processor focuses on the relative heat differences at the same location observed in real time, by using the lowest heat value measured within a road segment and calculating the sum of variances at given distance and time intervals.

In an alternative embodiment, the traffic information system can be used to detect fires in the geographic area. These fires may include forest fires or building fires.

In one embodiment, satellites are used to collect the thermal images. In alternative embodiments, various kinds of aircraft can be used, including helicopters, planes, gliders, drones, lighter-than-air craft, balloons, blimps, dirigibles, etc. Alternatively, a combination of satellites and aircraft may be used. In particular, one type of aircraft that could be used is a wind current counter balancing blimp aircraft. Such an aircraft includes a flexible solar panel covered body and electric wind correction turbines to achieve a stationary air platform. A downward facing, very high-resolution cylindrical wide-angle infrared imaging camera would be mounted on the stationary blimp platform. The camera's rotational stability could be achieved using a circular suspension from the blimp that would self-correct based on the camera's image feedback using an electric stepper motor. All of the electronics would be located on this rotating camera platform. The rotating electrical connection would be the cornerstone of this equipment (e.g., concentric electric wiring). The stationary blimp platform could also provide wireless Internet service, telecommunications and entertainment.

A thermal baseline can be established for all roads at night when traffic levels are low. The thermal baseline can then be compared to results during the day to determine traffic levels.

An alternative embodiment of this system can be used for identifying new road construction for updating road data contained in the geographic database. New road construction is an energy conversion activity that generates heat. Heat signatures generated from locations away from known existing roads might indicate the construction of new roads. When these heat signatures are observed in thermal images, field personnel from a geographic database developer are assigned to travel to the location of the possible new road construction to confirm the existence of new roads that are not contained in the geographic database.

As mentioned above, various traffic parameters are obtained by comparing the thermal image to an accurate map of the road network in a geographic region. One of these parameters is traffic speed. In one embodiment, traffic speed can be obtained from density data, i.e., from a relationship between density and speed, which can be derived empirically.

In another embodiment, traffic speed can be obtained from a thermal image video. A thermal image video is formed from a sequence of close-in-time thermal images of the geographic region. A frame-by-frame playback of this sequence of close-in-time thermal images forms the thermal image video. The frame rate could range from 60 frames/second to 1 frame/second. Traffic speed is determined by identifying specific individual vehicles on roads in a sequence of frames and then calculating the speeds of these vehicles from the relative change in position of these vehicles over time, which is II derived from the frame rate. Thus, the thermal image video can be used to provide a velocity vector at every point on the map at a given time, which could be integrated for dynamic route calculation purposes. A data transmission rate more than 1 frame/second could also account for traffic lights causing short term traffic congestions. In addition, the thermal image video can be used for the storage of the collected traffic data as an alternative to the storage of thermal image data in the traffic data model (64 in FIG. 2)

In another alternative, a speed flow map can be used for real time dynamic route calculation by employing two-dimensional parametric differentiation. Further differentiation may allow predicting traffic conditions in the future by employing known formulae extended to multiple dimensions.

The embodiments disclosed above use radiation in the thermal range for detection and/or indication of vehicular traffic. Other radiation frequencies within, below, and above this range, including the visible range, may be used in combination with frequencies the thermal range to enhance the accuracy of traffic detection.

Advantages

One of the advantages of the disclosed system is that it can be used to monitor traffic on all roads. Many prior systems are only cost effective on high volume roads.

It is intended that the foregoing detailed description be regarded as illustrative rather than limiting and that it is understood that the following claims including all equivalents are intended to define the scope of the invention.

We claim:

1. A method of collecting data that indicate traffic conditions on roads in a geographic area comprising the steps of:

scanning the geographic area from an altitude above the geographic area to obtain a thermal image of the geographic area;

map matching, using a data processor, the thermal image to data from a geographic database, the date representing locations of roads in the geographic area;

filtering, using the data processor, the thermal image to remove thermal data that do not correspond to the roads and proximate areas thereof; and using the filtered thermal image to determine at least one traffic parameter at the specific locations along said roads, using the data processor, wherein the map matching includes aligning locations in the thermal image with the locations of roads represented in the geographic database.

2. The method of claim 1 wherein the traffic parameter is related to heat differentials.

3. The method of claim 2 wherein the heat differentials are associated with heat generated by vehicles.

4. The method of claim 1 further comprising:

forming reports that indicate traffic parameters along said roads.

5. The method of claim 4 further comprising:

sending the reports indicating the traffic parameters to vehicles traveling along said roads.

6. The method of claim 1 wherein the traffic parameter includes density.

7. The method of claim 1 wherein the traffic parameter includes speed.

8. The method of claim 1 further comprising:

forming a thermal image video from a series of thermal images of the geographic area obtained over time.

9. The method of claim 8 further comprising:

deriving traffic speed from the thermal image video.

10. The method of claim 1 wherein the geographic database includes information about a legal speed limit corresponding to the respective roads.

11. A method of collecting data that indicate traffic conditions on roads in a geographic area comprising the steps of:

scanning the geographic area from an altitude above the geographic area to obtain a thermal image of the geographic area, wherein the thermal image is obtained with a satellite or aircraft;

matching, using a data processor, the thermal image to data representing roads from a road database, the data of the road database separate from image data obtained by the satellite or the aircraft;

determining, using the data processor, a change in temperature differential over time between a location on a road and an adjacent location off the road; and using the chance in the temperature differential to determine, using the data processor, and increase or decrease in at least one traffic parameter at the location on the road.

12. A system for collecting data that indicate traffic conditions on roads in a geographic area, the system comprising:

a satellite-based thermal imaging camera that takes a thermal image of the geographic area from an altitude above the geographic area;

a geographic database that includes data indicating positions of roads located in the geographic area, the data of the geographic database separate from image data obtained by the satellite-based thermal imaging camera; and a traffic data processor that receives the thermal image obtained by the satellite-based thermal imaging camera, uses the geographic database to align the data representing the positions of roads to locations in the thermal image, and determines at least one traffic parameter at specific locations along said roads using the thermal image, wherein the at least one traffic parameter is determined based on calculating a temperature differential between a location on a road segment and an adjacent location off the road segment.

13. The system of claim 12 further comprising:

a communications system by which the thermal images are transmitted from the satellite to the traffic data processor.

14. The system of claim 12 further comprising:

a reporting system that transmits traffic reports derived from the traffic parameter to drivers in the geographic area.

15. The system of claim 12 wherein the traffic parameter includes density.

16. The system of claim 12 wherein the traffic parameter includes speed.

17. A system for collecting data that indicate traffic conditions on roads in a geographic area, the system comprising:

means for obtaining thermal images of the geographic area from an altitude above the geographic area;

database means for containing data indicating locations of roads in the geographic area; and means for determining traffic conditions along said roads by map matching the thermal images to the roads indicated by the data contained in the database means and by removing thermal data corresponding to a location away from the roads.

18. The system of claim 17 wherein said means for obtaining thermal images includes a satellite.

19. The system of claim 17 further comprising:

means for distributing traffic reports indicating the traffic conditions to end user.

20. A method of collecting data that indicate traffic conditions on roads in a geographic area comprising the steps of:

scanning the geographic area from an altitude above the geographic area to obtain a thermal image of the geographic area;

matching, using a data processor, the thermal image to data from a geographic database, representing positions of roads in the geographic area;

determining, using the data processor, a temperature differential between a location on a road segment of the roads and a proximate location off the road segment based on the matching; and determining, using the data processor, at least on traffic parameter along the road segment as a function of the temperature differential.

* * * * *